United States Patent [19]

Miller

[11] Patent Number: 5,794,651
[45] Date of Patent: Aug. 18, 1998

[54] VALVE ADAPTOR CAP

[75] Inventor: Ronald T. Miller, Utica, Mich.

[73] Assignee: General Hydraulics Corporation, Sterling Heights, Mich.

[21] Appl. No.: 615,628

[22] Filed: Mar. 13, 1996

[51] Int. Cl.$^6$ .................................................. F16K 31/12
[52] U.S. Cl. .................. 137/454.5; 251/30.02; 137/884
[58] Field of Search ............... 251/30.01, 30.02; 137/884, 454.2, 454.5

[56] References Cited

U.S. PATENT DOCUMENTS

| | | |
|---|---|---|
| 4,078,574 | 3/1978 | Kosarzecki . |
| 4,706,547 | 11/1987 | LeBlon . |
| 4,785,848 | 11/1988 | Lieber ............................ 137/884 X |
| 4,964,611 | 10/1990 | Anderson ..................... 137/454.5 X |
| 5,156,184 | 10/1992 | Kolchinsky ................... 137/454.5 |
| 5,205,531 | 4/1993 | Kolchinsky . |
| 5,328,147 | 7/1994 | Stobbs . |

OTHER PUBLICATIONS

Vickers Catalog #US-C-441 dated Sep., 1989, Titled "Slip-in cartridge valves for hydraulic systems", pp. 5 and 14.
Vickers Modular Catalog #GB-C2006A [No date] Titled "Screw-in Cartridge valves", p. 25.

*Primary Examiner*—Kevin Lee
*Attorney, Agent, or Firm*—Harness, Dickey & Pierce, P.L.C.

[57] ABSTRACT

A valve adaptor cap providing for fluid communication between a slip-in cartridge valve inserted in a manifold block, and a screw-in cartridge valve oriented perpendicular to the manifold block. The slip-in cartridge valve controls the fluid flow within the manifold block with the screw-in cartridge valve controlling the operating position of the slip-in cartridge valve. The valve adaptor cap further provides access to passageway block offs or tuning orifices by way of access holes located on the side surfaces of the adaptor cap.

15 Claims, 4 Drawing Sheets

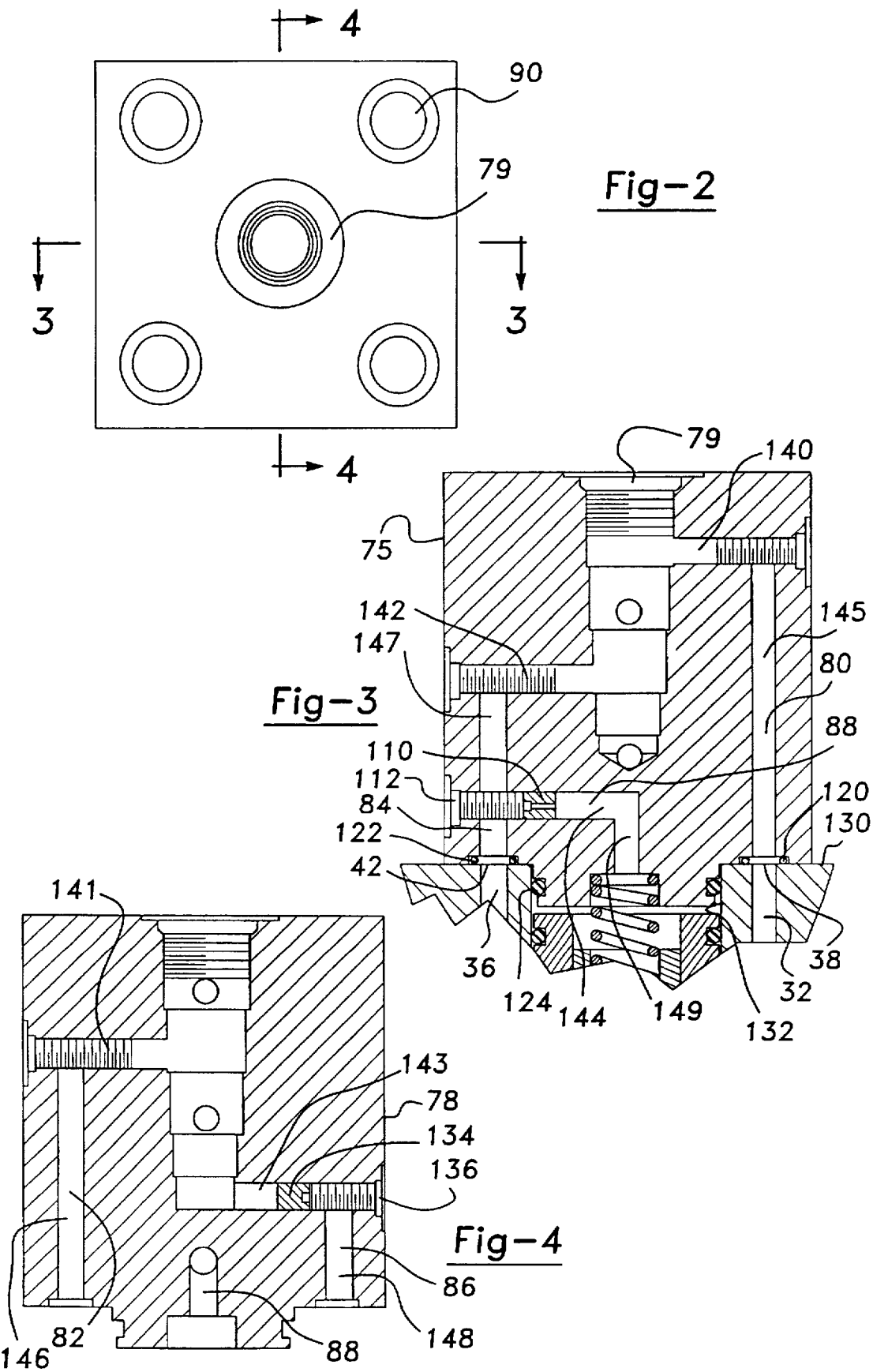

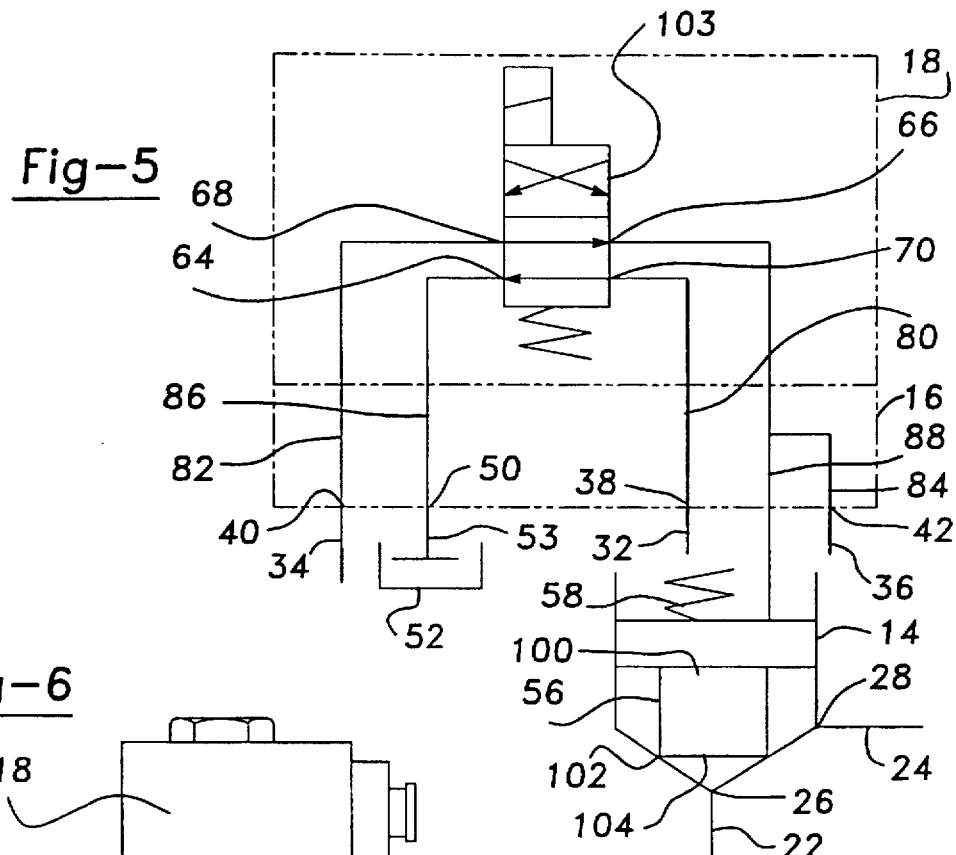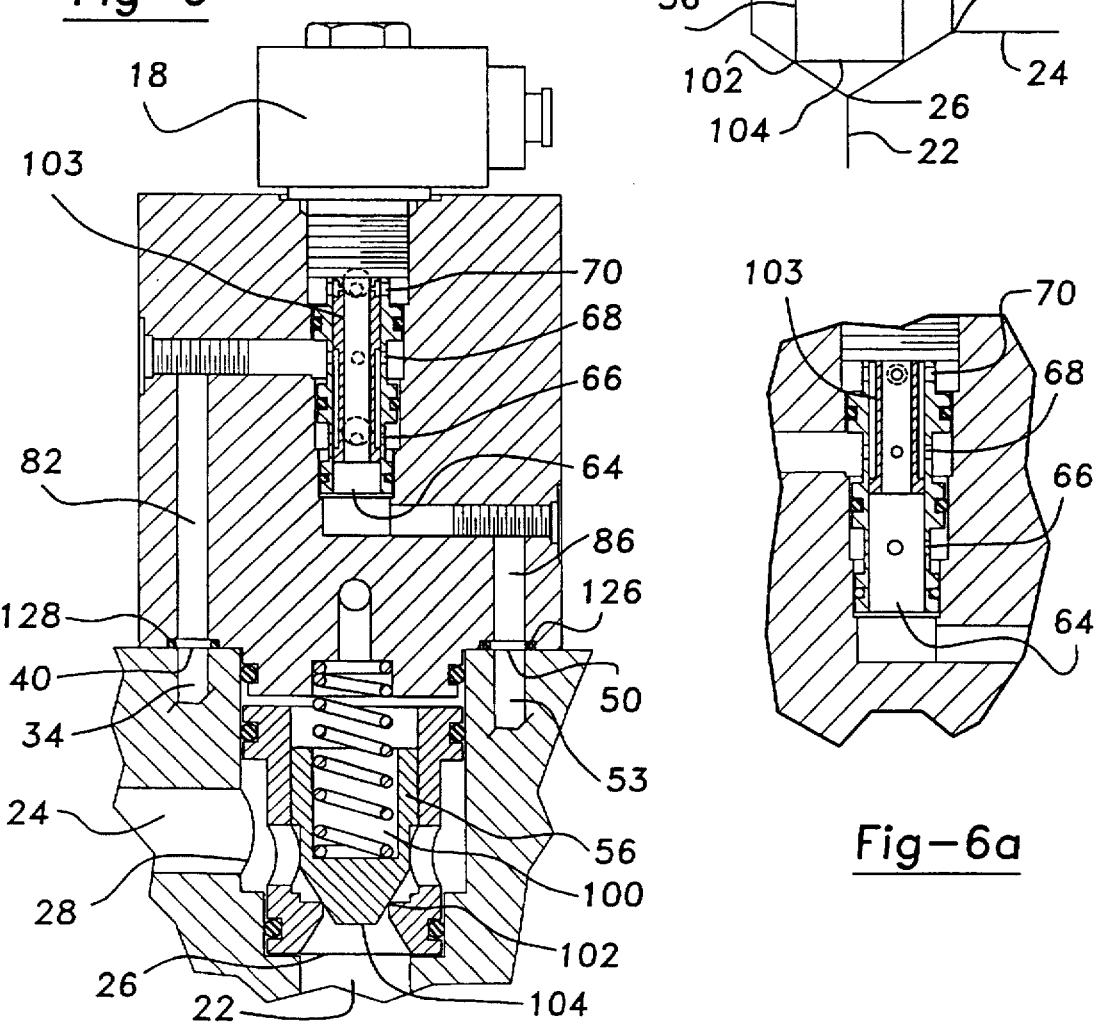

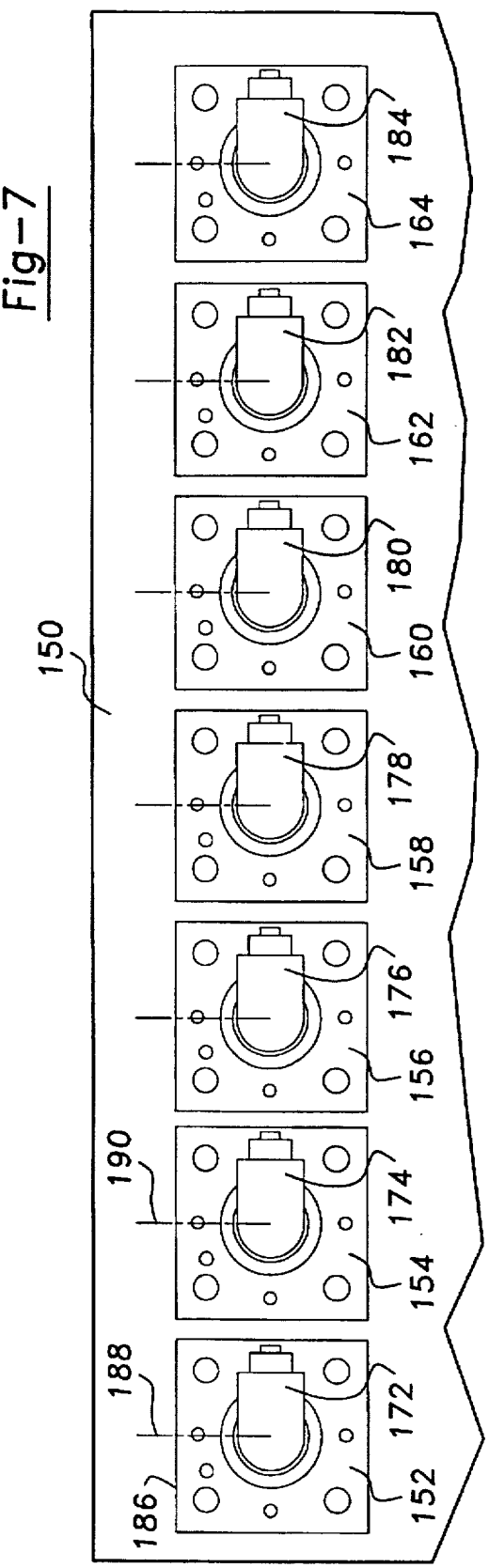
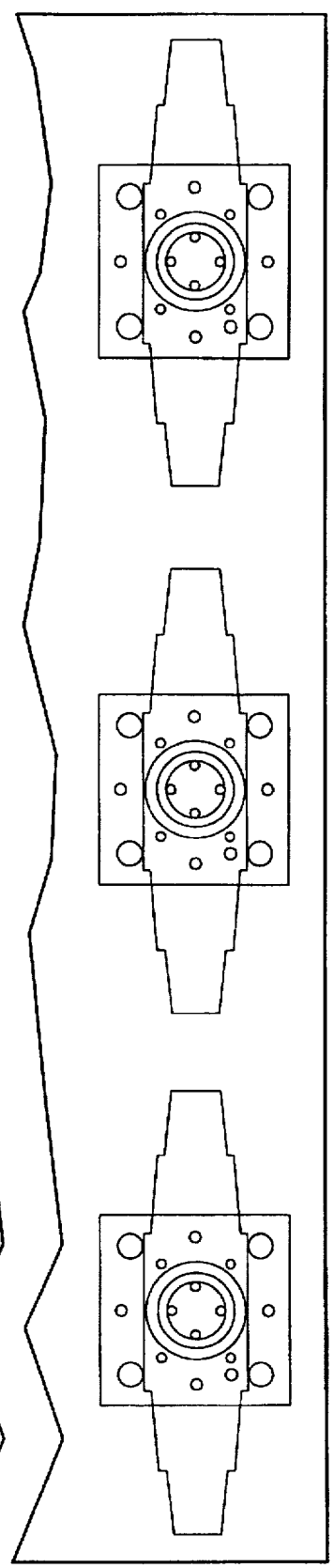

VALVE ADAPTOR CAP

BACKGROUND OF THE INVENTION

1. Technical Field

The present invention relates generally to fluid control valves interfacing with a manifold block, and more particularly to a valve adaptor cap providing an interface between a slip-in cartridge valve inserted in a manifold block and a screw-in cartridge valve used to control the operating position of the slip-in valve.

2. Discussion

Complex hydraulic and pneumatic systems are often required to provide control systems for commercial and industrial machines and devices. In order to minimize the number of connections and avoid the complex routing of lines from each control valve to other dependent or interrelated control valves, manifold blocks having complex interconnected passages are often utilized.

Manifold blocks improve reliability since there are fewer connections which can leak and create pressure losses. Further, manifold blocks provide a compact, space efficient system for interconnecting multiple control valve functions. One factor effecting the size of current manifold blocks is the spacing required between valve cavities which are machined into the manifold block. The cavities are designed to accept slip-in cartridge valves which regulate the flow of fluid within the hydraulic or pneumatic system.

Conventionally, slip-in cartridge valves are retained in the manifold block by a control cover which is bolted to the manifold. Prior art control covers either incorporate a sub-plate mounted pilot valve, or are designed to interface with a separate pilot valve.

An example of such valves are produced by Vickers where a slip-in cartridge valve CVI-25-D20 is retained by control cover CVCS-25-D2, and controlled by sub-plate mounted pilot valve DG4S4-012C. A disadvantage of these configurations is the orientation of the pilot valve, whether incorporated in the control cap or as a separate component. Prior art sub-plate mounted pilot valves are oriented with their major axis parallel to the surface of the manifold block. As shown in FIG. 8, the number of slip-in cartridge valves which can be incorporated in a manifold block is limited by the space required by the prior art pilot valves and the spacing required between the ends of adjacent valves. Generally a spacing of 1½ inches is provided between the ends of adjacent prior art pilot valves to allow access for manual actuation of the valves during maintenance or initial start-up and debugging of the system. The space requirement generally forces the use of larger manifold blocks. Larger manifold blocks require more space and are inherently more costly. The cost associated with larger manifold blocks is increased because of increased raw material, as well as the increased time and labor required to form longer passages interconnecting the valve cavities.

Further disadvantages of the prior art systems are the cost of sub-plate mounted pilot valves and the costs associated with tuning the systems. The cost of tuning the prior art systems is increased since the pilot valve and cover must be removed to gain access to passages designed to receive orifices used in tuning. Increased labor time and the risk of damaging one of the many O-rings or sealing surfaces on the cover or manifold block are the primary cost concerns.

SUMMARY OF THE INVENTION

In accordance with the teachings of the present invention, a valve adaptor cap is provided including a block having a first face and an opposite second face. Cap passages are provided within the block and provide for fluid communication between a screw-in cartridge valve and passages within a manifold block and a slip-in valve. The block is mounted to the manifold block with the first face of the block contacting the manifold block. Fastening means are provided to secure the block to the manifold block. The screw-in cartridge valve is received in an opening on the second face of the block, and is perpendicular to the first face of the block when received therein.

BRIEF DESCRIPTION OF THE DRAWINGS

Advantages of the present invention will become apparent to one skilled in the art upon reading the following detailed description, the appended claims, and upon reference to the drawings, in which:

FIG. 2 is a plan view of the valve adaptor cap shown in FIG. 1;

FIG. 3 is a cross-sectional view, with the adaptor cap being mounted to a manifold block, taken along line 3—3 of FIG. 2;

FIG. 4 is a cross- sectional view taken along line 4—4 of FIG. 2;

FIG. 5 is a schematic diagram representing the apparatus shown in FIG. 1;

FIG. 6 is an assembled sectional view of the apparatus shown in FIG. 1 wherein the screw-in valve is in a first position;

FIG. 6a is a partial sectional view of the apparatus shown in FIG. 1 wherein the screw-in valve is in a second position;

FIG. 7 is a plan view of a manifold block incorporating several valve adaptor caps made in accordance with the teachings of the present invention; and FIG. 8 is a plan view of a manifold block incorporating several prior art sub-plate mounted pilot valves and control covers.

DETAILED DESCRIPTION OF THE PREFERRED EMBODIMENT

Figure 1:
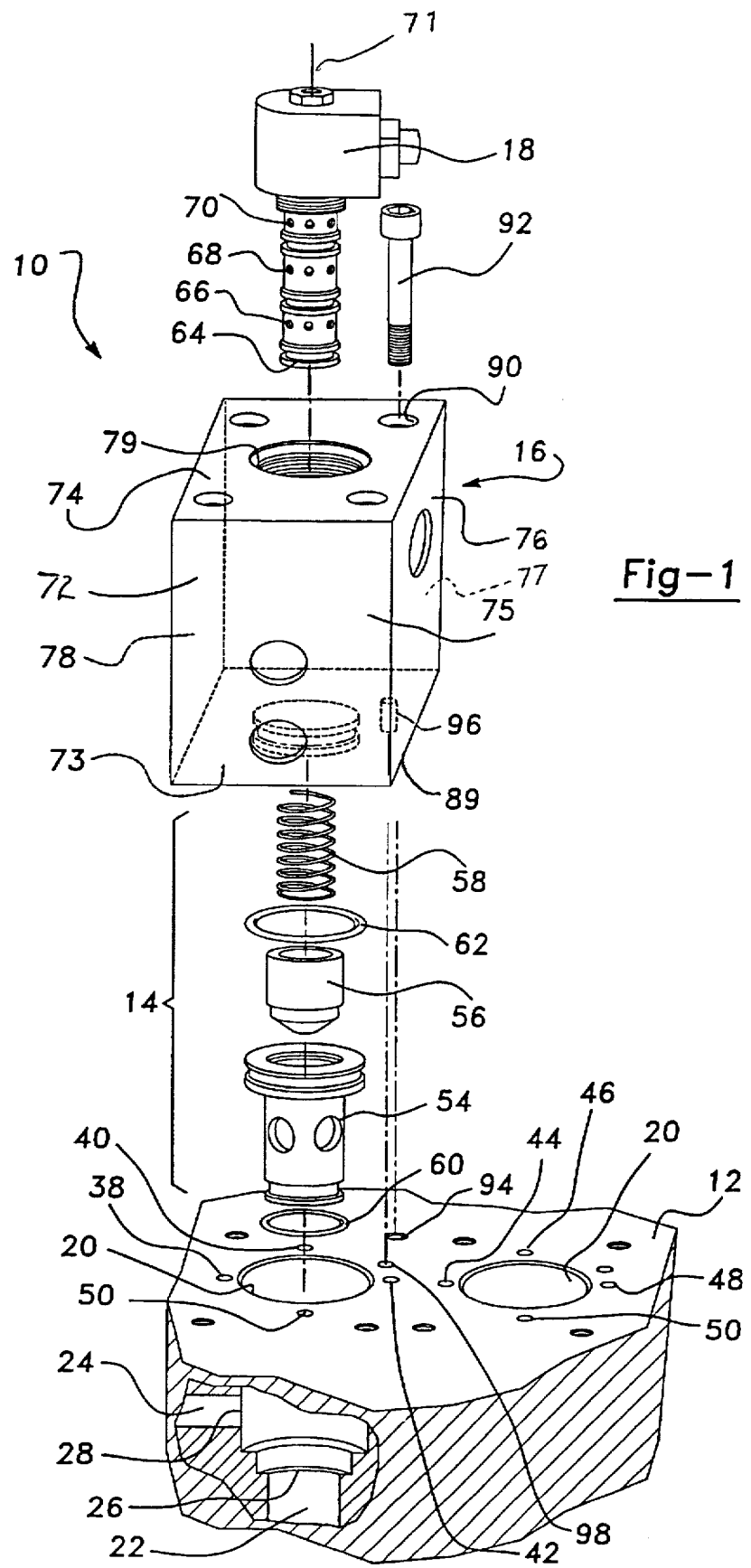
FIG. 1 is an exploded perspective view of an apparatus incorporating the teachings of the present invention.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Referring first to FIG. 1, there is shown a control system, generally at 10, for a hydraulic, pneumatic, or similar type of device. Control system 10 is generally comprised of four major components including: manifold block 12; slip-in cartridge valve 14; valve adaptor cap 16; and screw-in cartridge valve 18. By properly selecting and combining the screw-in cartridge valve 18 and the slip-in cartridge valve 14 in system 10 and interconnecting various slip-in valves within manifold block 12, control system 10 can be designed to provide control for a complex fluid operated device such as a press machine or a broaching machine.

In the preferred embodiment, manifold block 12 is made from a block of aluminum, steel, plastic, or other similar material. One or more cavities 20, each formed to receive a slip-in cartridge valve 14, are formed in manifold block 12 and are in fluid communication with cross-drilled fluid flow passages 22 and 24. Fluid flow passages 22 and 24 connect ports 26 and 28 within cavity 20 to other similar ports (not shown) or to the operating fluid system of the device being controlled. Further, cross-drilled control line passages 32, 34, and 36 (shown in FIGS. 3 and 6) in manifold block 12 interconnect control ports 38, 40, and 42 to other similar control ports 44, 46, and 48. One port is generally designated as a drain port 50 which is connected to a reservoir 52 by drain passage 53 (shown in FIG. 5).

Generally, slip-in cartridge valve 14 is a two operating position (i.e. open or closed) type of valve. However, mechanical or other means may be incorporated to limit the open position to less than a full open position, thereby controlling the flow rate of fluid within manifold block 12. Slip-in valves incorporating this limited open position can be incorporated in the present invention, as can slip-in valves having more than two positions. In the preferred embodiment, slip-in valve 14 is a two position valve including: housing 54; poppet valve 56; spring 58; and several O-rings 60 and 62 which provide sealing between housing 54 and cavity 20. An example of a commercially available two position slip-in valve is a Vickers model number 25-D20-10. It will be understood by those skilled in the art that a multi-position valve can be utilized depending on the control function to be achieved.

While control system 10 controls a flow of a fluid, screw-in cartridge valve 18 can be controlled and actuated by any number of methods including, but not limited to, electrical, mechanical, manual, hydraulic, or pneumatic. Screw-in valve 18 in the preferred embodiment is shown to be a four port directional valve having ports 64, 66, 68, and 70, and a longitudinal axis 71. A range of screw-in valves are currently available having from two to five ports, of which some or all of the ports may be utilized depending upon the design configuration and the desired results of control system 10. By way of a non-limiting example, screw-in cartridge valve 18 may be a Vickers Modular Control solenoid valve model number SV4-10-4-0-115AG.

FIG. 1 further shows a valve adaptor cap, generally at 16, made in accordance with the teachings of the present invention. Valve adapter cap 16 is shown to be constructed from a block 72 of aluminum, steel, reinforced resin, or other similar material. Cap 16 has a first face 73, an opposite second face 74, and side surfaces 75, 76, 77, and 78 connecting the opposite faces. Valve adapter cap 16 includes an opening 79 in second face 74 formed to threadingly receive screw-in valve 18, and contains cap passages 80, 82, 84, 86, and 88 (shown in FIGS. 3 and 4) which provide fluid communication between screw-in valve 18 and control ports 38, 40, and 42, drain port 50, and slip-in valve 14. A first portion of each cap passage is perpendicular to the manifold block with a second portion extending parallel to the manifold block and connecting to either opening 79 or another cap passage. First face 73 is bounded by a periphery 89 at the intersection of first face 73 with side surfaces 75, 76, 77, and 78.

The preferred embodiment of valve adaptor cap 16 further provides a plurality of bored holes 90 which allow threaded fasteners 92 to mount valve adapter cap 16 on manifold block 12 by engaging coordinated threaded bores 94 in block 12. An alignment pin 96 which coordinates with an alignment hole 98 in manifold block 12 is also provided such that cap 16 is properly oriented on block 12.

Referring to FIGS. 5 and 6, which schematically and sectionally depict an apparatus constructed in accordance with the teachings of the present invention, screw-in valve 18 is shown in a first position which corresponds to a closed operating position of slip-in valve 14. With screw-in valve 18 in the first position, fluid is allowed to flow from control line passage 34 through control port 40 and into cap passage 82. Port 68 of valve 18 is in fluid communication with cap passage 82 and, in this first position, allows fluid to exit valve 18 by way of port 66 which is in fluid communication with cap passage 88 and cap passage 84. The fluid flowing through cap passage 84 passes through control port 42 and into control line passage 36. The fluid flow directed from port 66 through cap passage 88 flows to slip-in valve 14 where pressure is applied to a first side 100 of poppet valve 56. The force of fluid applied to first side 100, in addition to the force applied to first side 100 by spring 58, is sufficient to force poppet valve 56 against valve seat 102 of housing 54. As such, fluid within fluid flow passage 22 is prevented from passing through port 26.

Further, with screw-in valve 18 in its first position, fluid is allowed to flow from control line passage 32 through control port 38 and into cap passage 80. Port 70 of screw-in valve 18 is in fluid communication with cap passage 80 and allows fluid flow to exit through port 64 and into cap passage 86. The fluid flowing through cap passage 86 exits by way of drain port 50, through drain passage 53, and into reservoir 52 which provides little or no back pressure.

Screw-in valve 18 may be actuated by any number of methods including, but not limited to, electrical, mechanical, manual, hydraulic, or pneumatic. When actuated, a shuttle valve 103 within valve 18 moves from a first position (shown in FIG. 6) to a second position as shown in FIG. 6a. With shuttle valve 103 in a second position, screw-in valve 18 is considered to also be in a second position which corresponds to an open operating position for slip-in valve 14. As such fluid is allowed to flow from the first side 100 of poppet valve 56 through cap passage 88 to port 66 of valve 18. The fluid then flows from port 66 and exits valve 18 at port 64 which is in fluid communication with cap passage 86. The fluid then passes by way of drain port 50 into drain passage 53 where it exits into reservoir 52. Since reservoir 52 provides little or no back pressure the force applied to first side 100 of poppet valve 56 is only that being applied by spring 58. The force applied by spring 58 is not sufficient to hold poppet valve 56 against valve seat 102 when the force of fluid in fluid flow passage 22 is applied to a second side 104 of poppet valve 56. As such, poppet valve 56 is raised to an open position and fluid is allowed to flow from fluid flow passage 22 through port 26, into housing 54. The fluid then exits housing 54 by way of port 28 and into fluid flow passage 24.

Further, with screw-in valve 18 in its second position, fluid is allowed to flow from control line passage 34 into cap passage 82 by way of control port 40. Cap passage 82 is in fluid communication with port 68 of valve 18, and allows fluid to exit valve 18 by way of port 70. The fluid then flows from port 70 through cap passage 80 and into control line passage 32 by way of control port 38.

As previously stated, control line passages 32, 34, and 36 interconnect control ports 38, 40, and 42, to other similar control ports such as control ports 44, 46, and 48 as shown in FIG. 1. By interconnecting the above control ports with valve adapter caps and screw-in cartridge valves similar to cap 16 and valve 18, control system 10 is designed to take a series of inputs which control the screw-in valve and translate that input to control the fluid flow within manifold block 12, thereby providing control for the hydraulic, pneumatic, or similarly controlled device.

Referring to FIG. 3, a tuning orifice 110 is shown to be inserted in cap passage 88. Access to tuning orifice 110 is provided by way of access hole 112 located on the side surface 75 of valve adapter cap 16. By providing access to orifice 110 from side surface 75 of cap 16 the tuning process of control system 10 is simplified. Since access to orifice 110 is available through access hole 112, valve adapter cap 16 need not be removed from manifold block 12 thereby saving labor time and reducing the risk of damage to O-ring seals 120, 122, 124, 126, and 128 (shown in FIG. 6). Further, the risk of damage to sealing surface 130 of manifold block 12 and sealing surface 132 of cavity 20 is reduced since these surfaces need not be exposed in order to access orifice 110.

As shown in FIG. 4, access to a passageway block off 134 is provided through access hole 136 in side surface 78. Passageway block offs are utilized when fewer than all of the control line passages are utilized in a control system. Block off 134 is generally a solid threaded cylinder with a slot or formed depression on one end (e.g. an allen head set screw) which is inserted in a passageway to completely prevent fluid from flowing through the passageway.

With further FIGS. 3 and 4, each cap passage is shown to include a portion which is parallel to and spaced from first face 73, shown as first portions 140, 141, 142, 143, and 144, and a portion which is perpendicular to and intersects first face 73, shown as second portions 145, 146, 147, 148, and 149. The first portion 144 of passageway 88 intersects with, and is in fluid communication with, second portion 147 of passageway 84. The remaining first portions 140, 141, 142, and 143 each intersect opening 79 and are in fluid communication with screw-in valve 18, as shown in FIG. 6.

FIG. 7 shows a manifold block 150 having several valve adaptor caps, 152 through 164, made in accordance with the present invention mounted thereon. By having screw-in valves, 172 through 184, oriented perpendicular to manifold block 150, the valves are generally contained within a the peripheries 186 of each cap 152 through 164. As such, a spacing of approximately ⅛ inch is all that is required between adjacent caps such as 152 and 154. Each valve adaptor cap typically has a 3½ inches by 3½ inches periphery 186 which contacts manifold block 140. As such, 3⅞ inches is required between the center lines 188 and 190 of adjacent caps 152 and 154, respectively. When compared to a prior art system as shown in FIG. 8, there is approximately a 2.5:1 ratio of valve adaptor caps made in accordance with the present invention verses the prior art control caps utilizing a sub-plate mounted pilot valve.

The foregoing discussion discloses and describes an exemplary embodiment of the present invention. One skilled in the art will readily recognize from such discussion and from the accompanying drawings and claims that various changes, modifications, and variations can be made therein without departing from the true spirit and fair scope of the invention as defined in the following claims.

What is claimed is:

1. A valve adaptor cap for a fluid control system, said valve adaptor cap providing an interface between a slip-in cartridge valve inserted in a manifold block having fluid flow passages, control line passages, and drain passages therein, and a screw-in cartridge valve for controlling an operating position of the slip-in valve, said valve adaptor cap comprising:

a block having a first face and an opposite second face, said first face for mounting to said manifold block and having a periphery, said second face having an opening for receiving a screw-in cartridge valve having a longitudinal axis, said opening being oriented generally perpendicular to said first face;

cap passages within said block providing fluid communication between said screw-in cartridge valve and said control line passages, said drain passage, and said slip-in valve;

fastening means for fastening said block to said manifold block such that said slip-in valve is secured within said manifold block; and said screw-in cartridge valve being oriented generally perpendicular to said first face when received within said opening so that a plurality of said valve adaptor caps can be compactly mounted to said manifold block.

2. The adaptor cap of claim 1 wherein said opening is formed to threadingly engage said screw-in valve such that said screw-in valve is substantially coaxial with said slip-in valve, said screw-in valve being substantially contained within said periphery of said first face when viewed along said longitudinal axis of said screw-in valve.

3. The adaptor cap of claim 1 wherein at least some of said cap passages each have a first portion which is generally parallel to and spaced from said first face of said block, and a second portion which is perpendicular to and intersecting said first face of said block; at least one of said first portions being in fluid communication with a second portion of another said cap passage, and the other of said first portions of said cap passages being in fluid communication with said screw-in valve.

4. The adaptor cap of claim 3 wherein access holes are provided on a side surface connecting said first face and said opposite second face, each of said access holes being in communication with at least one of said cap passages.

5. The adaptor cap of claim 4 wherein said cap passages are formed to receive a passageway block off, access to said passageway block off being provided by said access holes.

6. The adaptor cap of claim 4 wherein said cap passages are formed to receive a tuning orifice, access to said tuning orifice being provided by said access holes.

7. The adaptor cap of claim 2 wherein said cap is made of a reinforced resin material.

8. An apparatus for controlling fluid flow within a manifold block having fluid flow passages, control line passages, and drain passages therein, said apparatus comprising:

a slip-in cartridge valve located within said manifold block;

a valve adaptor cap having a first face for mounting on said manifold block and having a periphery, said valve adaptor cap contacting said slip-in valve, and providing cap passages aligned with said control line passages, said drain passage, and said slip-in valve; and a screw-in cartridge valve threadingly engaging said adaptor cap, said screw-in valve having a longitudinal axis, and controlling an operating position of said slip-in valve, said operating position of said slip-in valve controlling the flow of fluid within said fluid flow passages, said longitudinal axis of said screw-in cartridge valve being oriented generally perpendicular to said manifold block, and said screw-in cartridge valve being substantially contained within said periphery of said first face of said adaptor cap when viewed along said longitudinal axis.

9. The apparatus of claim 8 wherein said valve adaptor cap further comprises:

a block having said first face and an opposite second face, said second face having an opening for receiving said screw-in cartridge valve, said opening being oriented perpendicular to said first face;

said cap passages providing fluid communication between said screw-in valve and said control line passages, said drain passage, and said slip-in valve; and fastening means for fastening said cap to said manifold block such that said slip-in valve is secured within said manifold block by said cap.

10. The apparatus of claim 9 wherein at least some of said cap passages each have a first portion which is generally parallel to and spaced from said first face of said block, and a second portion which is perpendicular to and intersecting said first face of said block; at least one of said first portions being in fluid communication with a second portion of another said cap passage, and the other of said first portions of said cap passages being in fluid communication with said screw-in valve.

11. The apparatus of claim 9 wherein access holes are provided on a side surface connecting said first face and said opposite second face of said valve adaptor cap, each of said access holes being in communication with at least one of said cap passages.

12. The apparatus of claim 11 wherein said cap passages are formed to receive a passageway block off, wherein access to said passageway block off is provided by said access holes.

13. The apparatus of claim 11 wherein said cap passages are formed to receive a tuning orifice, wherein access to said tuning orifice is provided by said access holes.

14. The apparatus of claim 8 wherein said screw-in cartridge valve has at least two operating positions, said operating positions being controlled by means for actuating said screw-in cartridge valve.

15. A method for controlling the flow of fluid within a manifold block of a fluid control system, said method comprising:

providing a cavity within said manifold block which is in fluid communication with fluid flow passages within said manifold block;

inserting a slip-in cartridge valve within said cavity;

providing a valve adaptor cap having cap passages therein and having an opening for receiving a screw-in cartridge valve;

orienting said valve adaptor cap such that said cap passages are aligned with said slip-in valve, a plurality of control line passages and a drain passage within said manifold block, and such that said opening is positioned on a face opposite said manifold block;

fastening said adaptor cap to said manifold block such that said slip-in cartridge valve is secured within said manifold block by said adaptor cap;

providing a screw-in cartridge valve having a longitudinal axis and a plurality of ports; and fastening said screw-in cartridge valve to said opening of said adaptor cap such that said longitudinal axis is perpendicular to said manifold block, and said ports of said screw-in cartridge valve are in fluid communication with said cap passages.

* * * * *